United States Patent [19]

Cross et al.

[11] Patent Number: 4,693,600
[45] Date of Patent: Sep. 15, 1987

[54] OPTICAL BEAM ANALYZER

[75] Inventors: Michael A. Cross, Severna Park; Edward W. Nichols, Reisterstown, both of Md.

[73] Assignee: Westinghouse Electric Corp., Pittsburgh, Pa.

[21] Appl. No.: 922,797

[22] Filed: Oct. 23, 1986

Related U.S. Application Data

[63] Continuation of Ser. No. 854,067, Apr. 17, 1986, abandoned, Continuation of Ser. No. 547,603, Nov. 1, 1983, abandoned.

[51] Int. Cl.$^4$ ................................................ G01J 1/00
[52] U.S. Cl. ...................................... 356/121; 356/73; 356/375; 356/226
[58] Field of Search .......... 356/73, 121, 122, 225–227, 356/318, 375

[56] References Cited

U.S. PATENT DOCUMENTS 4,320,462  3/1982  Lund et al. ...................... 356/73 X Primary Examiner—F. L. Evans
Attorney, Agent, or Firm—R. P. Lenart

[57] ABSTRACT

A system for analyzing the characteristics of a light beam is disclosed. Functionally, the system includes an optical system for collecting the light beam to be analyzed. An array of light-sensitive elements is positioned at the focal plane of the optical system. A digital system sequentially samples the output signals of the light sensors and processes the resulting data to generate signals indicative of the characteristics of the light beam.

5 Claims, 10 Drawing Figures

OPTICAL BEAM ANALYZER

This application is a continuation of application Ser. No. 854,067 filed Apr. 17, 1986, now abandoned, which is a continuation of application Ser. No. 547,603, filed Nov. 1, 1983, now abandoned.

BACKGROUND OF THE INVENTION

1. Field of the Invention

The invention relates to optical systems and more specifically to a digital system for analyzing the characterisics of laser beams.

2. Description of the Prior Art

Prior art systems for analyzing the characteristics of highly collimated light signals such as laser beams have typically utilized some type of TV system. These systems required a change in the optics of the system for large changes in the beam divergence. Laser systems having a repetition rate greater than 15 Hz. were also difficult to test. Additionally, the registration characteristics of the system introduced non-linearity effects resulting in a non-linear callibration requirement. Typically, the dynamic range of the prior art systems was limited to about 100:1 ratio.

SUMMARY OF THE INVENTION

The disclosed system utilizes a linear array of light sensors positioned at a predetermined location in the optical path of the system. In the preferred embodiment, the location of the linear array of sensors is in the focal plane of the optical path. Each element of the linear array generates an electrical output signal having a known relationship to the optical energy impinging thereon. The array is mechanically stepped to scan a predetermined area of the focal plane. Selectable passive attenuators are utilized to increase the effective dynamic range of the sensors. Data processing apparatus is provided which permits the collection and processing of large amounts of data to determine selected characteristics of a beam and the generation of displays related to the beam characteristics.

DESCRIPTION OF THE PREFERRED EMBODIMENT

Figure 1:
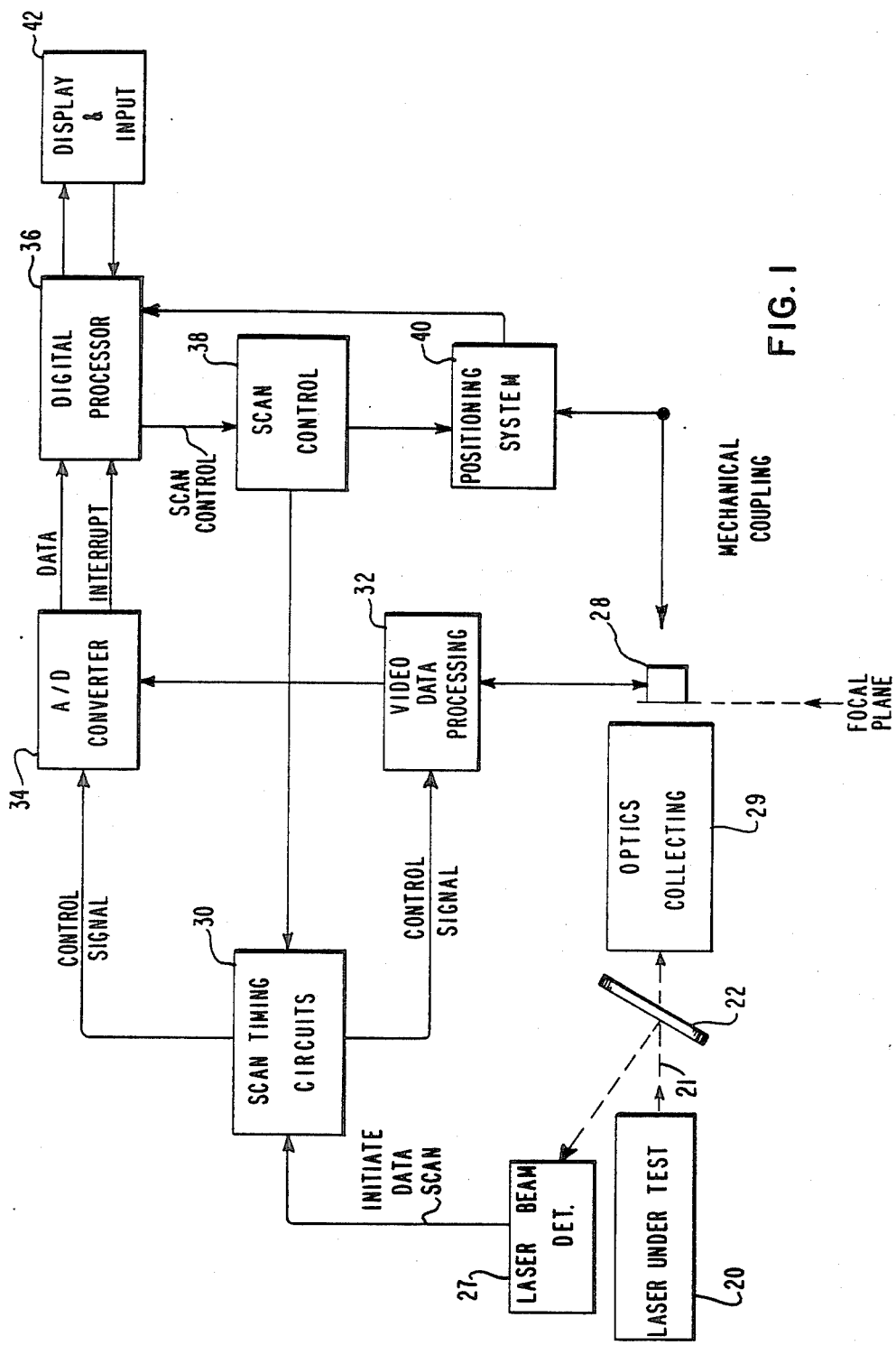
FIG. 1 is a functional block diagram of the invention.

FIG. 1 is a block diagram of the preferred embodiment of the system. Functionally, the system is designed to analyze a highly collimated light beam such as the highly collimated optical output beam of a laser 20. The laser 20 is positioned such that the output beam passes through an attenuator 22. Input attenuator 22 is positioned at an angle with respect to the axis 21 of the output beam of the laser causing a small portion of the laser beam to be reflected to a laser beam detector 27. The laser beam as attenuated enters into an optical collecting apparatus 29.

Optical collecting apparatus 29 performs two basic functions, those being the focusing of the collimated optical beam at a known focal plane and further selectively attentuating the optical beam, as necessary, to avoid overloading of a sensor array 28 positioned in the focal plane of the collecting optics 29. This variable attenuation increases the effective dynamic range of the sensor array 28. The desired attenuation is preferably provided by passive attenuators which can be manually changed. Each individual sensor of the sensor array 28 generates an electrical output signal having a known relationship to the optical energy impinging thereon.

When the laser detector circuit 27 detects the laser beam, a sync signal is generated and coupled to the scan timing circuits 30. Scan timing circuit 30 generates control signals for the video data processing unit 32 and for an analog-to-digital converter 34. In response to these signals the video data processing circuit 32 sequentially selects sensors of the linear array 28, which in the preferred embodiment comprises a linear array of 1024 photo diodes, and couples the output signal of the selected sensors to the analog to digital converter 34. Details of the sensor selection will be subsequently described. Additionally, the video data processing circuit 32 may correct the analog output signals of the array of sensors for linearity and include circuits to reduce noise introduced by the clock signal used to scan sensors of the array 28. In response to a control signal from scan timing circuit 30, the analog-to-digital converter 34 generates a digital number representative of the output signal of the selected sensor of the sensor array 28 and couples this digital number along with an interrupt signal to a digital porcessor 36. When a digital number representative of the output signal of each sensor of the selected group has been generated, the digital processor 36 generates a slew signal which is coupled to scan control circuitry 38. In response, the scan control circuit 38 generates control signals which are coupled to a positioning system 40 to sequentially move in predetermined increments, the linear sensor array 28 in the focal plane of the collecting optics 29 such that a selected area of the focal plane is scanned. In this manner data in the form of digital numbers is generated and stored in a memory which may be part of the digital processor 36, the data having a predetermined relationship to the energy profile of the portion of the laser beam entering the collecting optics 29 and focused on the scanned portion of the focal plane.

After the data collection cycle described above has been completed, the digital processor 36 processes the data signals to generate a display of the desired type and performs other desired data analysis. These signals are coupled to a display and input system 42 to generate the desired display. Display and input system 42 also serves the function of providing a means for inputting programs and other data to the digital processor 36. Data displays which may be generated using known data processing and display techniques include curves illustrating the energy distribution of the laser beam along a selected line, a false color display with different colors representing different power levels and isometric plots of the power density. Additionally, it is obvious that the processor 36 may perform any other type of data analysis which can be performed based on an intensity profile. All that is necessary is to provide the digital processor 36 with sufficient processing capability and programs.

Figure 2:
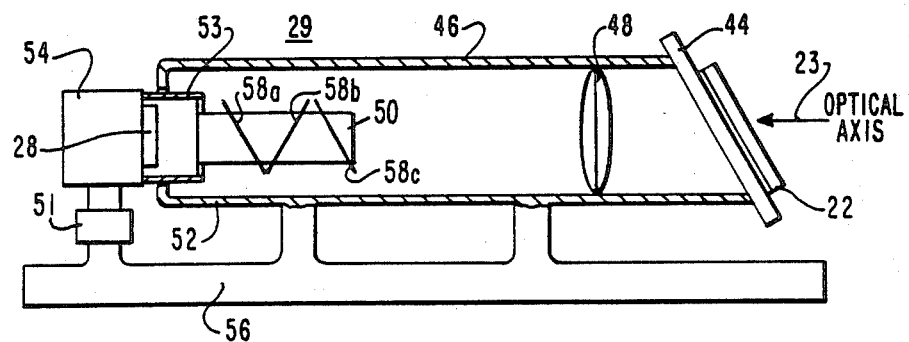
FIG. 2 is a diagram illustrating the mechanical portions of the system.

FIG. 2 is a more detailed representation of the collecting optics 29. The entrance to the collecting optics 29 is sloped with respect to the optical axis 23 and covered by an optically transparent faceplate 44. An entrance attenuator 22 is positioned adjacent the faceplate 44 and held in place using any convenient mechanical support. This external mounting of the entrance attenuator 22 permits it to be easily changed to select the desired attenuation.

The main body of the collecting optical system is a tube-like structure 46 made of optically opaque material such as aluminum. Positioned in the interior of the tube-like member 46 and near the entrance is a collective optical lens system 48. This lens system may take any convenient form from a single simple lens to a compound multi-lens system with the basic function being focusing of the laser beam on the focal plane where the linear array detector 28 is positioned. The laser beam passing through the collecting optics also passes through additional level attenuator system 50 of any convenient design prior to emerging through an opening in the exit end of the tube-like portion 46. In the system illustrated in FIG. 2 the attenuator system 50 includes three filter elements 58a, 58b and 58c.

The linear optical array 28 is securely affixed to a support and drive system 54. This system provides two functions. The first being rigidly maintaining the linear array 28 in the focal plane of the optical collecting system 29 and the second being motorized micrometer positioning apparatus to permit the linear array to be moved in small precise increments in a direction perpendicular to the axis of the collecting optics to scan a selected portion of the focal plane of the optical collecting system. A manually adjustable micrometer system permits a fine adjustment of the detector array 28 along the optical axis 23 to provide a fine focussing adjustment. The optical collecting system 29 and the sensor positioning mechanism 54 are securely and mechanically supported by a suitable base member 56. A mechanical adjustment is provided to move the sensor array 28 in the vertical direction to properly align the array 28. A light shield 53 surrounds the linear array of detectors 28 and extends into the outer tube 46 a distance sufficient to shield the array of detectors 28 from excessive external light.

Figure 3:
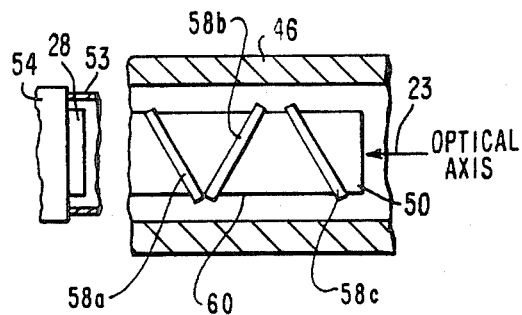
FIG. 3 is a fragmented view illustrating the optical attenuators.

FIG. 3 illustrates a more detailed diagram of the attenuator system 50. The tube portion 46 of the collecting optics 26 includes an access opening near the top which permits access to the level attenuating filters 58a, 58b and 58c. These attenuating filters are conventional optical attenuators positioned at an angle relative to the optical axis 23 of the optical collecting system. A convenient holder 60 supports the filter elements 58a, 58b and 58c. In its most convenient form the support 60 comprises a series of slots positioned in two opposing support walls which permits the attenuators 58a, 58b and 58c to be conveniently slid into the slots through the opening in the top of the tube member 46. The opening in the tube-like member 46 should be provided with a suitable cover to exclude light.

Figure 4:
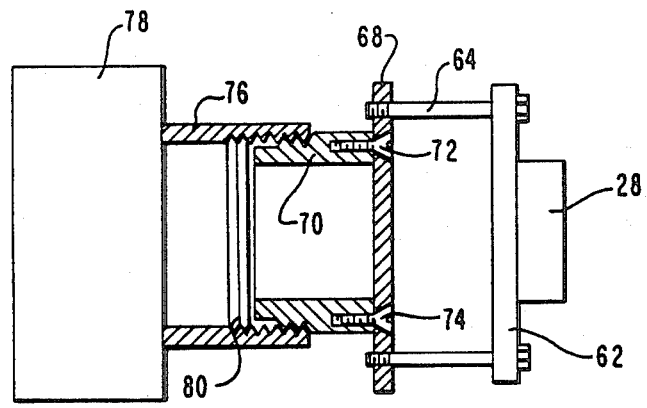
FIG. 4 is a diagram illustrating a mechanical mounting of the detector array.

FIG. 4 is a more detailed diagram of the mounting structure for the linear array 28. More specifically, the linear array 28 is secured to a plate member 62 using any convenient means. Plate member 62 is affixed to and spaced from a second plate member using bolts and spacer members 64 and 66. Conventional screws, 72 and 74 fasten the second plate member 68 to a mounting ring 70. Mounting ring member 70 includes a threaded portion which mates with a second ring member 76. The second ring member is in turn secured to a mechanical support apparatus 78 which is ultimately positioned by the electrically driven micrometer positioning system to scan the array 28 in the horizontal direction as previously discussed. The mechanical support apparatus 78 also includes the manual micrometer focus and scan devices previously discussed. Conventional prior art commerically electrically driven and manual micrometers may be used for these functions.

A jam ring 80 also mates with the threaded portion of ring 76 and is tightened against ring member 70 to secure the array 28 in the desired position. This arrangement permits the array of detectors 28 to be rotated to any desired radial orientation. Even though this is a manual function it does permit intensity profiles along a selected radial orientation to be determined. After each manual rotation of the array of detector 28, it may be necessary to refocus the system using the manual micrometer. If this feature is not desired the plate 62 may be secured directly to the mechanical support 78.

Figure 5:
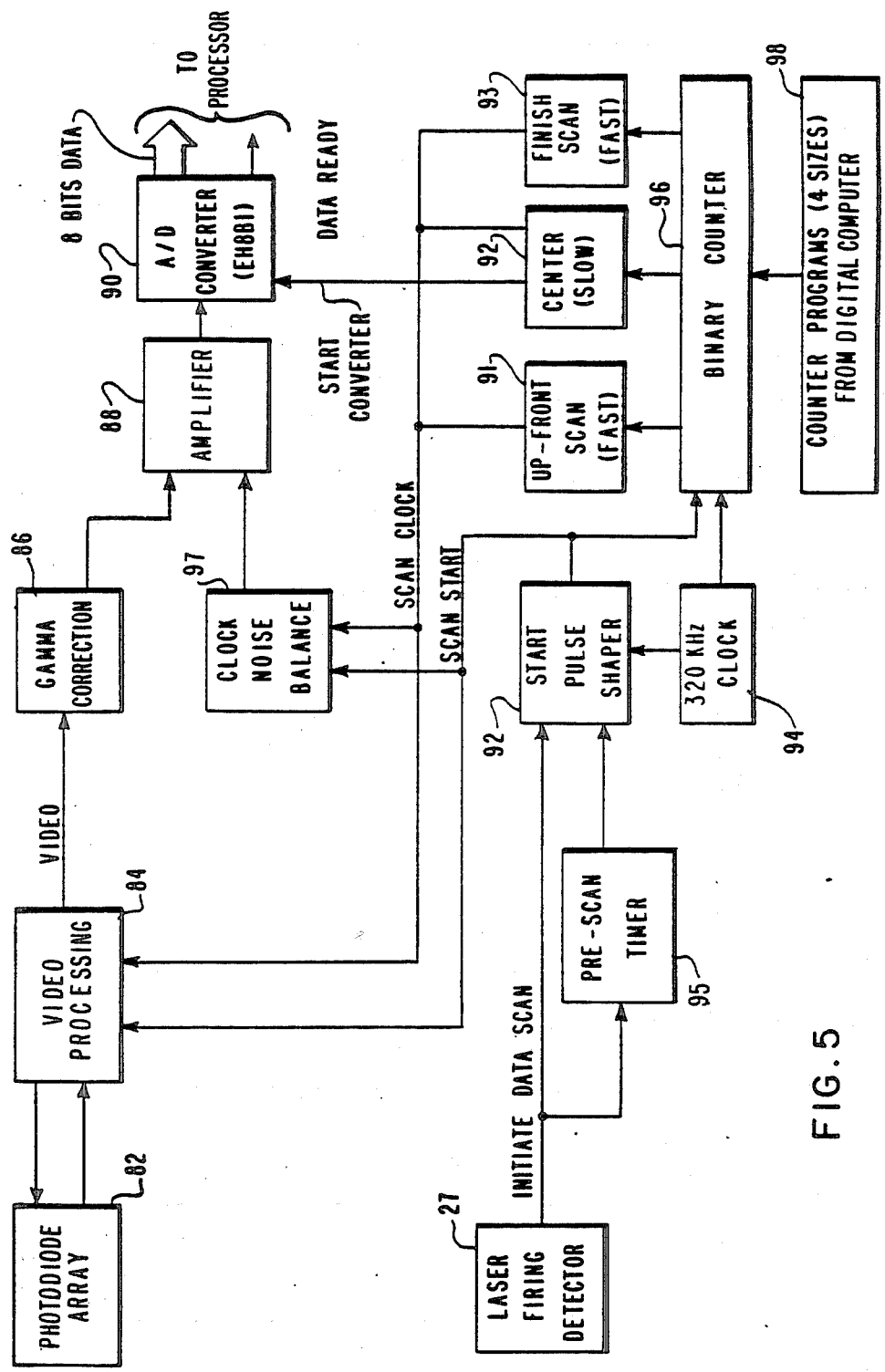
FIG. 5 is a functional block diagram of the data collection portion of the system.

FIG. 5 is a block diagram illustrating in more detail the functioning of the system. The linear array 28 is an array of photodiodes comprising 1,024 individual diodes. This array is functionally illustrated at reference numeral 82. Video processing circuit 84 receives as input the analog output signals of each diode of the array 82, a scan clock signal and a scan start pulse. In response to these signals the video processing circuit 84 selects the output of a single diode of the array 82 and couples this signal to a gamma correction circuit 86. Gamma correction circuit 86 couples the gamma corrected video data to an amplifier circuit 88. Amplifier 88 also receives an input signal from a clock noise balance circuit 97 to produce at the output a corrected analog video signal. Functionally, clock noise balance circuit 97 generates an analog square wave signal at the array scanning frequency. This signal is combined with the gamma corrected signal to reduce noise at the clock frequency in the output signals of the array 82. The photodiode array 82, and video processing circuit 84 are portions of a commercially available array type RL1024G produced by EG&G Reticon.

The analog video signal which has been gamma corrected and has clock noise reduced is coupled to the input of an analog-to-digital converter 90. Analog-to-digital converter 90 also receives a start signal from a step-through counter 92 and produces at its output an 8 bit digital representation of the analog input signal and a data ready signal which is coupled to the digital processor as an interrupt signal.

Figure 6:
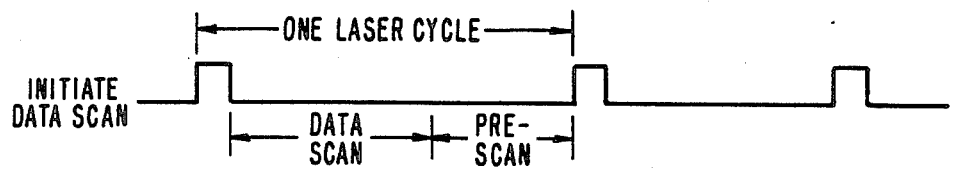
FIG. 6 is a timing diagram illustrating the timing of the data scan and pre-scan cycles.

The system is initiated by a detection of the laser beam impinging on the collector optics 22 (illustrated in FIG. 1) by the laser firing detection circuit 27. The initiate data scan signal from the laser firing detector 27 is coupled to a start pulse shaper circuit 92. The initiate data scan signal is a square wave signal at the PRF of the laser as illustrated in FIG. 6. Start pulse shaper circuit 92 also receives a clock signal from a free running clock circuit 94. In response to these signals the start pulse shaper circuit 92 generates a scan-start signal which is coupled to the video processing circuit 84 as previously described and to a binary counter 96. Binary counter 96 is programmed by a programmer 98 permitting the first portion of each line scan during which no data is collected to be scanned at a high rate (320 KHz), a second portion during which data is collected to be scanned at a lower rate (20 KHz) and a third portion during which no data is collected to be scanned at the high rate. This minimizes total line scan time while permitting a data collection rate which matches the computer data induction rate.

Functionally this is accomplished by the upfront scan circuit 91 which generates a clock signal at the fast rate for the lower numbers of the binary counter 91, the center (slow) counter 92 which generates the 20 KHz clock for the central portion and the finish scan circuit 93 which again generates the 320 KHz clock signal for the remainder of the line scan cycle.

Figure 7:
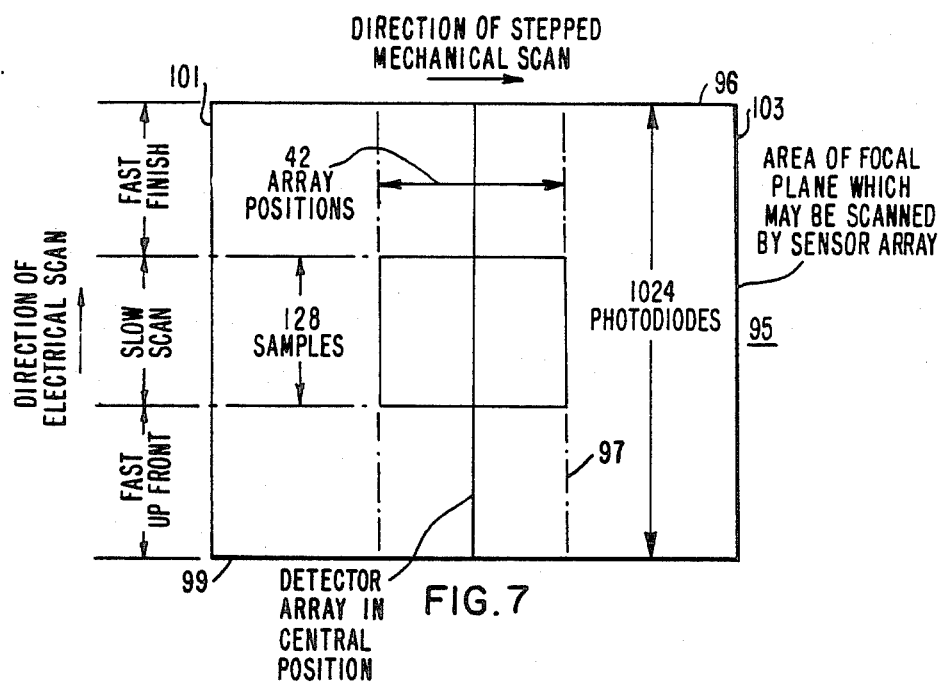
FIG. 7 is a diagram illustrating the focal plane and the areas of the focal plane which are scanned at fast and slow rates.

This scanning technique is illustrated in more detail in FIG. 7. An area of the focal plane 95 which may be scanned by the array of sensors. An area 97 which can be scanned using the electrically driven micrometer has a height equal to the long dimension of the array 82 and a width determined by the fractional distance the motor driven micrometer is to be moved in discrete steps between extreme edges 101 and 103. In order to permit the area 97 over which data is to be collected to be selected from the entire area 95 of the focal plane which may be scanned, the motor driven micrometer may be slewed under manual control to locate the array of detectors 28 at any selected initial position between the left and right edges 101 and 103. During each complete data collection cycle, the detector array 28 starts from and is automatically returned to the selected initial position.

By way of example, when a data collection cycle is initiated, the array of detectors 28 is rapidly slewed from a central initial position to the left edge of the selected area 97 of the focal plane which is to be scanned. The UP-FRONT scan circuit 91 is initiated to generate the high frequency clock signal which scans the detector array 28 at a 320 KHz rate over the lower portion of area 97. When the scan arrives at the central portion of area 97, the slow scan circuit 92 is initiated to slow the rate of scan while data is collected at a 20 KHz rate. The central portion of area 97 may utilize either 128, 256, 512, or 1024 sensors in the detector array as specified by the counter programs from the digital computer. During each discrete step of the positioning system the output signals of selected sensors (128 in number) will be sampled to generate a digital number representative of the light signal impinging thereon. When the scan arrives at the upper portion of area 97, the fast finish scan circuit 93 is initiated and completes the electrical scan of the detector array at a 320 KHz clock rate. When data has been collected for the desired number of steps (42 in all), the initialize and return circuit 106 is initiated to rapidly slew the detector array 28 back to the central starting position to await another data collection cycle.

Figure 8:
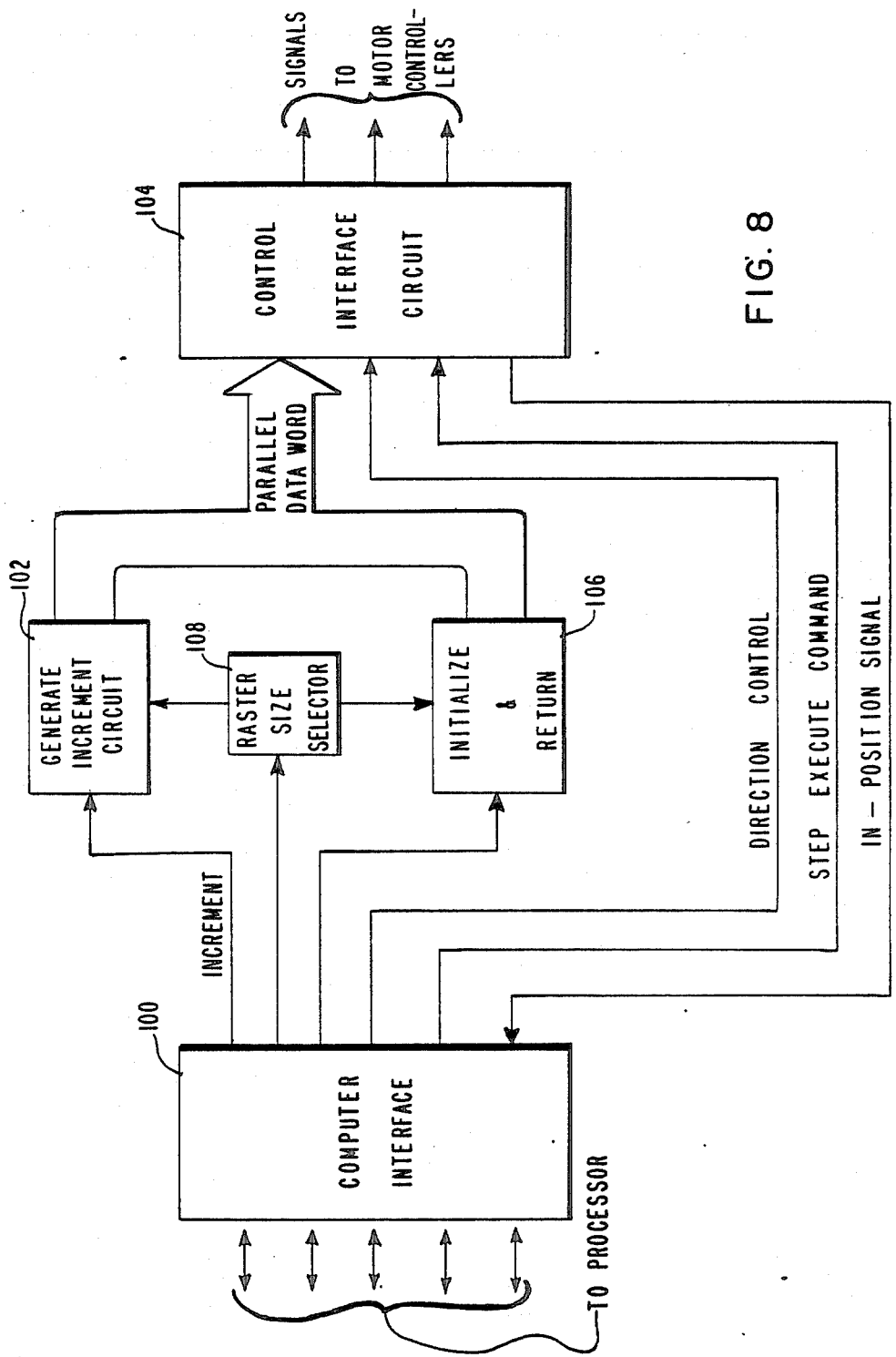
FIG. 8 is a functional block diagram of the stepping motor control circuits.

FIG. 8 is a more detailed diagram of the scan control circuitry 38 illustrated in FIG. 1. Functionally, an interface circuit 100 is coupled directly to the data bus of the digital processor 36. This permits the digital processor 36 to communicate with the scan control circuit 38 using the normal interface instructions of the digital processor. A data word indicating that the motor driven micrometer positioner is to be incremented to change the position (scan) of the digital array 28 by one increment is detected by an increment circuit 102. This circuit generates a signal (a predetermined bit pattern of the data word) which is directly coupled to the positioning system (motor driven micrometer) by a control interface circuit 104. Similarly, a computer code comprising a data word having a predetermined bit pattern indicating that a new cycle is to be initiated is detected by the initialize and return circuit 106. The output signal of this circuitry is similarly coupled to the positioner by the control interface circuit 104. A raster-size selector circuit 108 is also coupled to the computer interface 100 to receive control words and in response thereto to generate control signals which are coupled to the increment circuit 102 and the initialize and return circuit 106 to assure that the array starts in the right position and is incremented in the proper size increments. Within the limits of the system, these signals control the dimensions of the area of the focal plane scanned 97, FIG. 7, in the direction of electrical scanning as previously explained.

Computer interface circuit 100 also decodes selected computer commands and generates a direction control signal which is coupled directly to the control interface 104 and a step execute command to initialize the execution of all the instructions. Additionally, the control interface circuit 104 generates an in-position signal which is coupled through the computer interface 100 to the processor indicating that all of the instructions to the position control have been executed and that stable data should be available from the output of the detector array 28.

Figure 9:
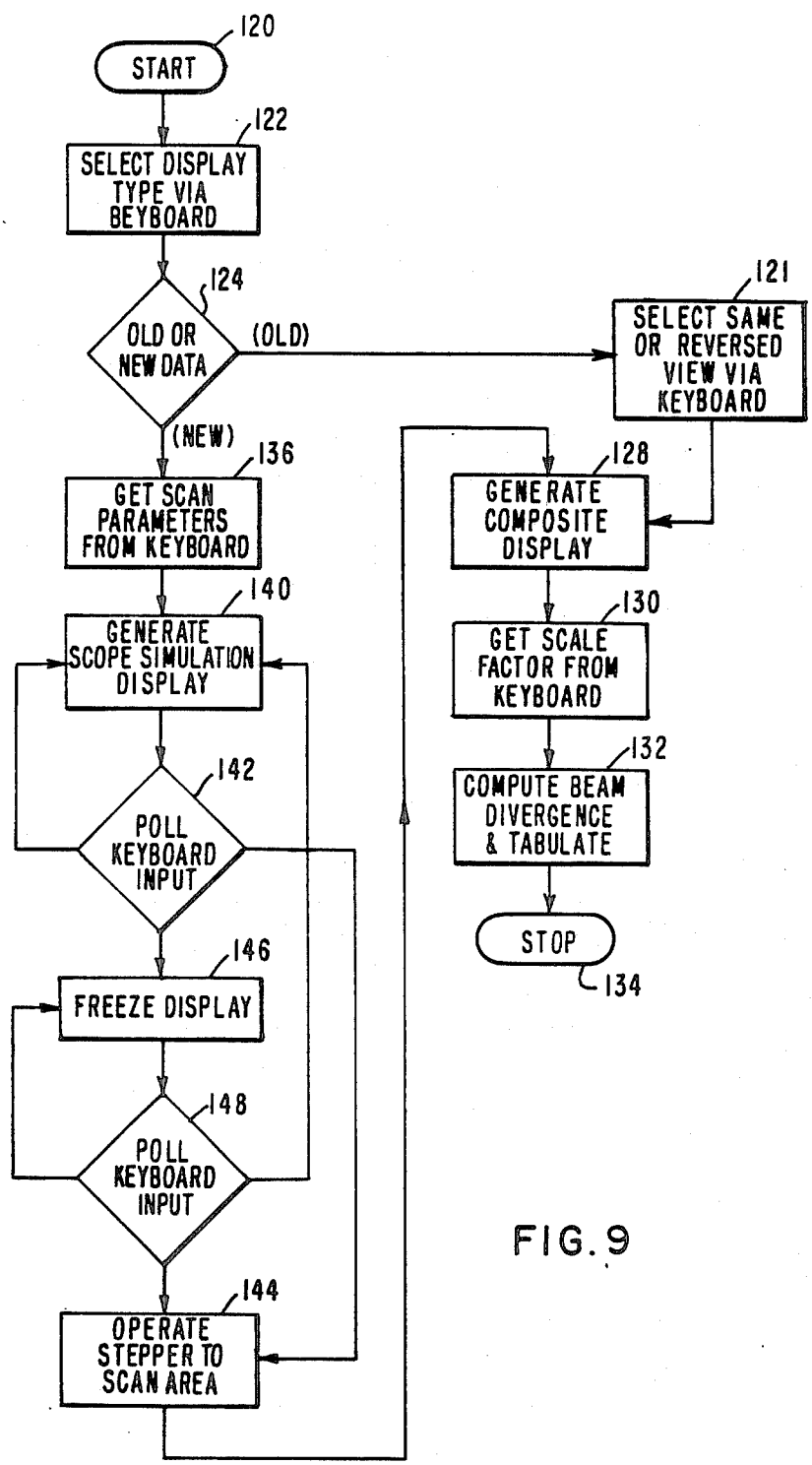
FIG. 9 is a flow chart illustrating the data processing functions.

The data processing cycle is functionally illustrated in FIG. 9. As will be appreciated, the data collection apparatus previously described collects sufficient data to permit the intensity profile of the collimated light beam to be determined. Data collected may be processed in any manner and displayed using a conventional CRT display in any desired form, limited only by the processing capability of the digital processor 36 and the programming of this processor. Thus, the processing cycle illustrated in FIG. 9 is only one example of a useful data processing cycle.

The data processing cycle is initiated by a start signal to the data processor 36 (FIG. 1). This signal is functionally illustrated at reference No. 120 and may be generated using any means.

Following the start of the data processing cycle, the type of display desired is selected via a conventional keyboard coupled to the digital processor. Types of displays which can be generated include isometric displays of the far field footprint of the collimated beam and false color intensity displays. Displays may also be generated using either new or previously collected data. Selection of the type of display desired and whether it will be generated using old or new data is respectively functionally illustrated at reference numerals 122 and 124.

Assuming old data is to be used, a selection is made as to whether the same view as the previous display cycle or its reverse is to be used. This selection is also made via the keyboard and is functionally illustrated at reference numeral 121. Following selection of the view, the data stored in the computer is processed to generate the data for the display. Scale factors to select the size of the display are also provided via the keyboard. These functions are respectively functionally illustrated at reference numerals 128 and 130. Following these signals the data generating the display is coupled to the CRT and the display is complete.

After the display has been completed, other numerical analysis of the data can be made. In the experimental system this analysis included a computation of the beam divergence, as functionally illustrated at reference numeral 132. The results of the numerical analysis are coupled to an output device such as a printer and the data processing cycle terminates as functionally illustrated at reference numeral 134.

Assuming that the displays are to be generated using new data, the new scan parameters to the data collection system previously described are provided via the keyboard as functionally illustrated at reference numeral 136. After these parameters have been provided, the data for generating the desired display is calculated as functionally illustrated at reference number 140. Following generation of the display, signals are provided from the keyboard to continue updating the display, freeze the display or initiate a new scan cycle to collect new data. This step is functionally illustrated at reference numeral 142, 144, 146 and 148.

If a new data collection cycle is to be initiated, a signal is generated which updates the stored data. This step is functionally illustrated at reference numeral 144. Following updating of the data, the new display is generated as illustrated at reference numeral 128 and the cycle proceeds to its completion as previously discussed.

If a freeze display cycle is to be initiated, the current display is completed and retained until terminated by a signal from the keyboard as functionally illustrated at reference numerals 146 and 148. If the current display is terminated a signal is generated to update the data as illustrated at reference numeral 144. The data cycle then proceeds to its termination as previously discussed.

Figure 10:
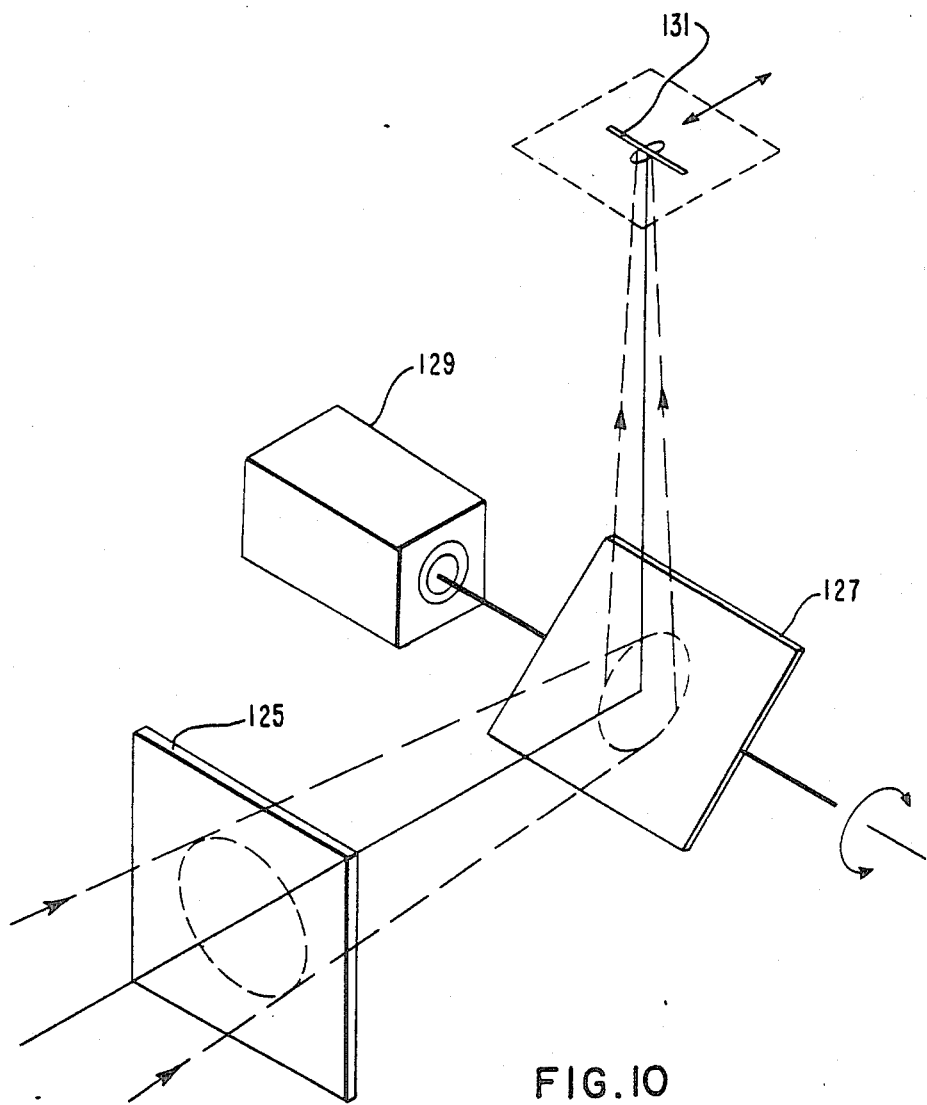
FIG. 10 illustrates an alternate embodiment of the scan apparatus.

FIG. 10 illustrates an alternate embodiment of the scanning mechanism. The beam emerging from the collection optics impinges upon a filter 125 to adjust the intensity of the beam being analyzed. After passing through the filter 127 the beam impinges upon a mirror 127 which is driven back and forth in an oscillatory motion by a mechanical drive 129. The linear array of detectors 131 is positioned in the focal plane of the lens. The oscillation of the mirror 127 causes the beam to move back and forth across the array of detectors 131 permitting a profile of the beam to be sampled.

We claim:

1. A system for determining selected characteristics of a collimated optical signal directed along a predetermined optical path comprising:
   (a) means for sampling said collimated optical signal to generate a synchronizing signal;
   (b) optical apparatus positioned in said predetermined optical path for focusing said collimated optical beam in a predetermined focal plane;
   (c) a linear array of photodetectors;
   (d) means for supporting said linear array of photodetectors in said predetermined focal plane including selective positioning means for moving or stepping the linear array in small precise increments in a direction perpendicular to the optical path to thereby mechanically step or scan the linear array over a predetermined area of the focal plane in response to said synchronizing signal;
   (e) electronic scan means for collecting data from said linear array and operable at each stepped increment position of the linear array to scan the linear array at an initial predetermined fast scan rate at one end portion of the linear array, and at a predetermined slow scan rate over a central portion of the linear array, and at the predetermined fast scan rate over the other end portion of the linear array; and
   (f) data collecting and processing apparatus coupled to receive the output signals of said linear array of photodetectors and said synchronizing signal for generating signals indicative of selected characteristics of said collimated optical signal.

2. The system for determining the characteristics of a collimated optical signal in accordance with claim 1, wherein said optical apparatus includes a focusing lens and a manually changeable attenuator positioned between said lens and said array of photodetectors.

3. A system for determining the characteristics of a callimated optical signal in accordance with claim 2 wherein said data processing apparatus includes apparatus for calculating the divergence of said callimated optical signal entering said optical apparatus.

4. A system for determining the characteristics of a callimated optical signal in accordance with claim 3 wherein said processing apparatus includes apparatus for calculating the power centroid of said callimated optical signal.

5. A system for determining the characteristics of a callimated optical signal in accordance with claim 4 wherein said processing apparatus includes apparatus for calculating the total power of said collimated optical signal.

* * * * *